US011209055B2

(12) United States Patent
Arienti et al.

(10) Patent No.: US 11,209,055 B2
(45) Date of Patent: Dec. 28, 2021

(54) CALIPER AND SUPPORT ASSEMBLY AND CALIPER DEFORMATION DETECTION METHOD

(71) Applicant: FRENI BREMBO S.P.A., Curno (IT)

(72) Inventors: Roberto Arienti, Curno (IT); Carlo Cantoni, Curno (IT); Andrea Meschini, Curno (IT); Alberto Comenduli, Curno (IT)

(73) Assignee: Freni Brembo, S.p.A., Bergamo (IT)

( * ) Notice: Subject to any disclaimer, the term of this patent is extended or adjusted under 35 U.S.C. 154(b) by 31 days.

(21) Appl. No.: 16/625,946

(22) PCT Filed: Jul. 5, 2018

(86) PCT No.: PCT/IB2018/054972
§ 371 (c)(1),
(2) Date: Dec. 23, 2019

(87) PCT Pub. No.: WO2019/008534
PCT Pub. Date: Jan. 10, 2019

(65) Prior Publication Data
US 2020/0158197 A1    May 21, 2020

(30) Foreign Application Priority Data
Jul. 5, 2017   (IT) .................. 102017000075649

(51) Int. Cl.
*F16D 55/22* (2006.01)
*F16D 65/00* (2006.01)
(Continued)

(52) U.S. Cl.
CPC ........ *F16D 65/0056* (2013.01); *B60T 17/221* (2013.01); *F16D 55/22* (2013.01);
(Continued)

(58) Field of Classification Search
CPC .. F16D 65/0056; F16D 65/0068; F16D 55/22; B60T 17/221
See application file for complete search history.

(56) References Cited

U.S. PATENT DOCUMENTS 4,679,668 A      7/1987  Washizu et al.
5,678,662 A  *  10/1997  Giorgetti ................. F16D 66/02
                                                                188/1.11 W
(Continued)

FOREIGN PATENT DOCUMENTS

DE     102012007118 A1   10/2013
WO     2012/059894 A2     5/2012

OTHER PUBLICATIONS

European Patent Office, International Search Report with Written Opinion, issued in PCT/IB2018/054972, dated Oct. 11, 2018, 12 pages, European Patent Office, Rijswijk, Netherlands.

*Primary Examiner* — Christopher P Schwartz
(74) *Attorney, Agent, or Firm* — Marshall & Melhorn, LLC

(57) ABSTRACT

A caliper and supporting assembly for a disc brake may have a brake caliper with a caliper body adapted to straddle an associable disc of the disc brake, a supporting element connected to a caliper body, where the caliper body may have a first portion, and the supporting element may have a second portion. During braking action, the caliper body elastically deforms according to at least one predetermined direction, thereby determining a displacement in at least the predetermined direction of the first portion of the caliper body with respect to the second portion of the supporting element. The caliper and supporting assembly may also have at least one detecting device which detects a distance at least along the predetermined direction between the first portion of the caliper body and the second portion of the supporting element.

11 Claims, 6 Drawing Sheets

(51) Int. Cl.
  *B60T 17/22* (2006.01)
  *F16D 66/00* (2006.01)
  B60T 1/06 (2006.01)
  F16D 55/00 (2006.01)

(52) U.S. Cl.
  CPC ......... *F16D 65/0068* (2013.01); *F16D 66/00* (2013.01); *B60T 1/065* (2013.01); *F16D 2055/0008* (2013.01); *F16D 2055/0016* (2013.01)

(56) References Cited

U.S. PATENT DOCUMENTS

| | | |
|---|---|---|
| 6,247,560 B1 | 6/2001 | Bunker |
| 6,511,135 B2 | 1/2003 | Ballinger et al. |
| 6,640,937 B2 | 11/2003 | Bunker |
| 7,813,860 B2 | 10/2010 | Horiuchi et al. |
| 8,146,715 B2 | 4/2012 | Baier-Welt |
| 9,371,874 B2 | 6/2016 | Previtali et al. |
| 2009/0320579 A1* | 12/2009 | Ante ................. F16D 55/22 73/121 |
| 2011/0174581 A1* | 7/2011 | Vollert ............... F16D 55/22 188/72.1 |
| 2012/0198926 A1 | 8/2012 | Baumgartner et al. |
| 2016/0153510 A1* | 6/2016 | Rothfuss ............ F16D 66/00 188/1.11 E |

* cited by examiner

CALIPER AND SUPPORT ASSEMBLY AND CALIPER DEFORMATION DETECTION METHOD

FIELD OF THE INVENTION

The present invention relates to a caliper and supporting assembly for a disc brake.

In particular, the present invention relates to a caliper and supporting assembly comprising a detecting device.

The present invention further relates to a detecting method.

PRIOR ART

In a disc brake, the brake caliper is generally arranged straddling the outer peripheral margin of a brake disc, adapted to rotate about a rotational axis. Brake calipers are constrained to a support structure which remains stationary with respect to the vehicle wheel, such as, for example, a stub axle of a vehicle suspension, or a vehicle wheel hub, or a fork or swingarm of a motor vehicle. The brake caliper comprises a caliper body having two elongated portions arranged so as to face opposite braking surfaces of a brake disc, and at least one bridge, which connects said two elongated portions to each other.

Brake pads generally comprise a pad onto which friction material is fixed, adapted to press against a facing braking surface of the braking band of the brake disc. In brake calipers for applications in the field of racing, brake pads are used in which the plate is made in one piece with the friction material. The plate may comprise auditory wear indicators, sometimes embedded in the friction material, which have the function of emitting a sound, by rubbing against the brake band of the disc when the friction material has thinned axially due to prolonged use.

In floating caliper bodies associated with fixed discs, a floating or sliding portion of the caliper body has a cylinder, or cylinders, adapted to accommodate thrust means capable of applying a thrust action on the friction pads facing it, abutting it against the braking surface of the disc, while it slides on the bracket, or fixed portion of the caliper, and acts on the second clutch pad abutting it against the brake disc to apply the braking action.

In caliper bodies associated with fixed discs, a cylinder or cylinders is or are present on both opposite sides of the caliper body to accommodate thrust means, capable of applying a thrust action on the friction pads facing it, thereby abutting it against the braking surface of the disc.

Conversely, fixed caliper bodies associated with floating discs are also known, in which only one of the elongated portions of the caliper body has a cylinder or cylinders adapted to accommodate the thrust means capable of applying a thrust action on the facing friction pad, abutting it against the braking surface of the disc, which in turn slides axially on its support and abuts against the opposite friction pad to apply the braking action.

In hydraulically actuated braking systems, the pressure applied by the vehicle driver on the brake pedal applies, through a brake master cylinder, a brake fluid pressure which through a pipe is applied to the brake fluid present in the hydraulic circuit placed inside the caliper body to reach the cylinders where the pressure is applied onto the bottom surface of the pistons, thereby forcing them to be close against the pads, which in turn abut against the braking surfaces of the disc.

The pressure action of the brake fluid is also applied on the bottom wall of the cylinder, thereby causing a reaction in the caliper body which deforms it away of the disc surfaces. This phenomenon is known as elastic deformation or "strain" of the caliper, which by moving away from the brake disc forces a further bias of the thrust means on the pad to apply the desired braking action.

When the braking action ceases, and thus when the bias which deforms the caliper body away from the brake disc ceases, the caliper body returns to its undeformed resting configuration, approaching the brake disc again, and thus approaching the pads to the braking surfaces. This approaching of the pads to the brake disc is undesired because it determines a contact, albeit minor, between pad and disc, which determines a continuous minor friction and thus a braking action, also known as residual braking torque, also when the braking command by the driver of the vehicle ceases.

This residual braking torque is often considered undesired because it generates noise, albeit minor, caused by the friction action between pads and disc braking surfaces, an undesired wear of the pads and of the brake disc, which implies more frequent maintenance for their replacement, and a minimum fuel consumption for feeding the drive unit with the energy, even if minimum, needed to overcome this residual torque.

During the braking action, the friction pads closed against the braking band of the disc undergo by effect of the rotation a feeding acceleration by friction directed in tangential or circumferential direction until they abut against tangential abutment portions of the caliper body, such as for example pins supporting the pad or protruding walls provided in the caliper body.

This feeding action is transferred onto the caliper body and tends to determine an elastic elongation deformation in tangential direction of the caliper body, and particularly of the caliper body portion which is located between the fixing elements of the caliper body to the supporting structure fixed to the vehicle. This tangential elongation deformation is typically contrasted by providing constraining elements of the caliper body to the supporting structure, e.g. fixing pins or bushes usually placed at transversely opposite sides of the friction pad, and thus usually generates jamming tangential jamming or "buckling" phenomena of the caliper body, which generate elastic instability and cause the onset of flexural and torsional stresses on the caliper body.

Furthermore, because of the constraints between the caliper and its supports usually placed only on the caliper side of the hub side elongated element, a further cutting and a torsional deformation may occur, which makes the elongated element not constrained to the support, or wheel side elongated element, move with respect to the hub side elongated element, thereby flexing the caliper bridges which connect these elongated elements to one another.

Otherwise, in braking systems of the brake-by-wire type, particularly for high-performance vehicles, in which the brake pedal is not connected by a hydraulic circuit to the calipers thrust means, a detecting system associated with a data processing unit is present to measure the action applied by the vehicle driver onto the brake pedal and to calculate the corresponding power to be transmitted to the brake caliper thrust means to abut the pads against the opposite braking surfaces of the disc. For the vehicle driver, the braking feeling with brake-by-wire systems changes radically with respect to that of hydraulically actuated brakes, especially as regards the mechanical feedback provided by the brake pedal, thereby resulting in lower sensitivity for the driver, which may result in poor braking control.

The need to quantify the braking action is therefore strongly felt.

Several solutions for quantifying the braking action in floating calipers based on the indirect measurement of the braking torque have been suggested, i.e. based on detecting quantities associated with the braking torque entity, typically the flexural deformation of the portions of the brake caliper or of its support.

For example, document DE-102012007118 shows a sensor system adapted to detect the flexural deformation of dedicated overhanging connection bridges of the caliper body of a floating caliper to the supporting structure. For example, document U.S. Pat. No. 6,511,135 shows a solution which is adapted to detect the flexural deformation of the arm of the supporting bracket to the floating caliper placed on the side of the caliper body which sees the disc outlet or the disc outlet side and on which the braking action is released.

These solutions, although advantageous from some points of view, are applied only to floating calipers and may be complicated to make, e.g. by requiring the making of dedicated mechanical devices which overhangingly protrude from the caliper body adapted to be deformed by bending. It should also be noted that the measurement of a non-linear quantity, as for example the flexural deformation of a portion of the overhangingly positioned caliper body, used in such solutions as the basis for calculating the braking torque, imposes a substantial uncertainty in the quantification of the braking action.

Document U.S. Pat. No. 8,146,715 shows to make, by means of laser cutting, an incision in the body of the floating caliper to make an overhanging shelf excluded from the flow of the forces which are generated during the braking action. Proximity sensors are used to measure the variation of the width of such incision during braking in the axial direction. In addition, document US-2012-0198926 shows a device for detecting displacements in axial direction between a bracket on which the friction pads are mounted and an elongated portion of the floating caliper body.

Such solutions do not solve the problem and the measurement of the axial deformation of the brake caliper is not adapted to provide a reliable estimate of the braking action, because the axial deformation is correlated in a non-proportional manner to the braking torque, because of unknown and variable friction according to the wear condition of the friction material, to the operating conditions, such as temperature of the disc, and environmental conditions such as rain.

The need is therefore felt to quantify in repeatable and reliable manner the braking action on the brake calipers of floating type and of fixed type.

The need is strongly felt to measure the deformation of the caliper body in simple and at the same time repeatable and reliable manner.

SOLUTION

It is an object of the present invention to solve the drawbacks of the prior art and to provide a solution to the needs mentioned above.

Some advantageous embodiments are the object of the dependent claims.

FIGURES

Further features and advantages of the assembly and of the method will be apparent from the following description of its preferred embodiments, given by way of non-limiting examples, with reference to the accompanying figures, in which.

DESCRIPTION OF SOME PREFERRED EMBODIMENTS

Figure 1:
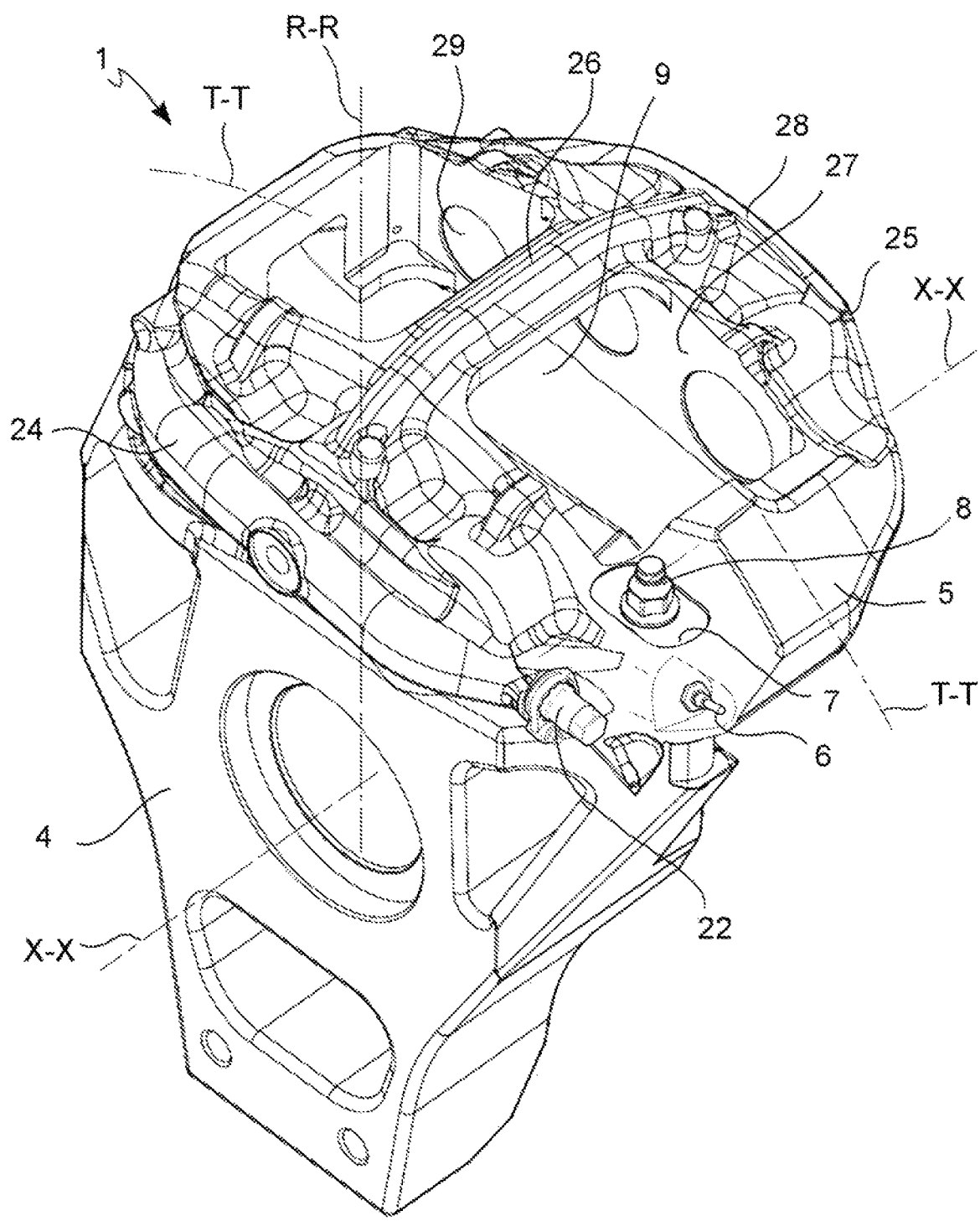
FIG. 1 is an axonometric view of a caliper and supporting assembly, according to an embodiment.
Figure 2:
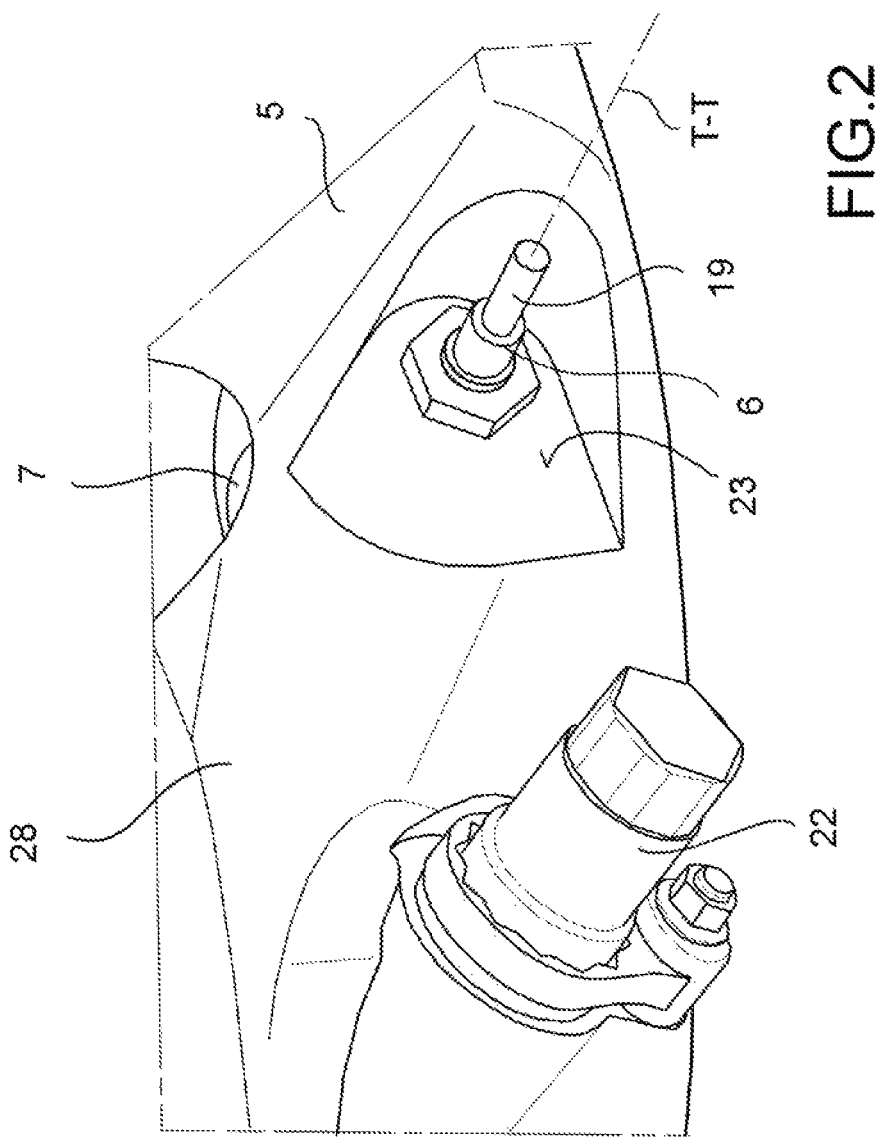
FIG. 2 is an axonometric view of a portion of a brake disc, according to an embodiment.
Figure 3:
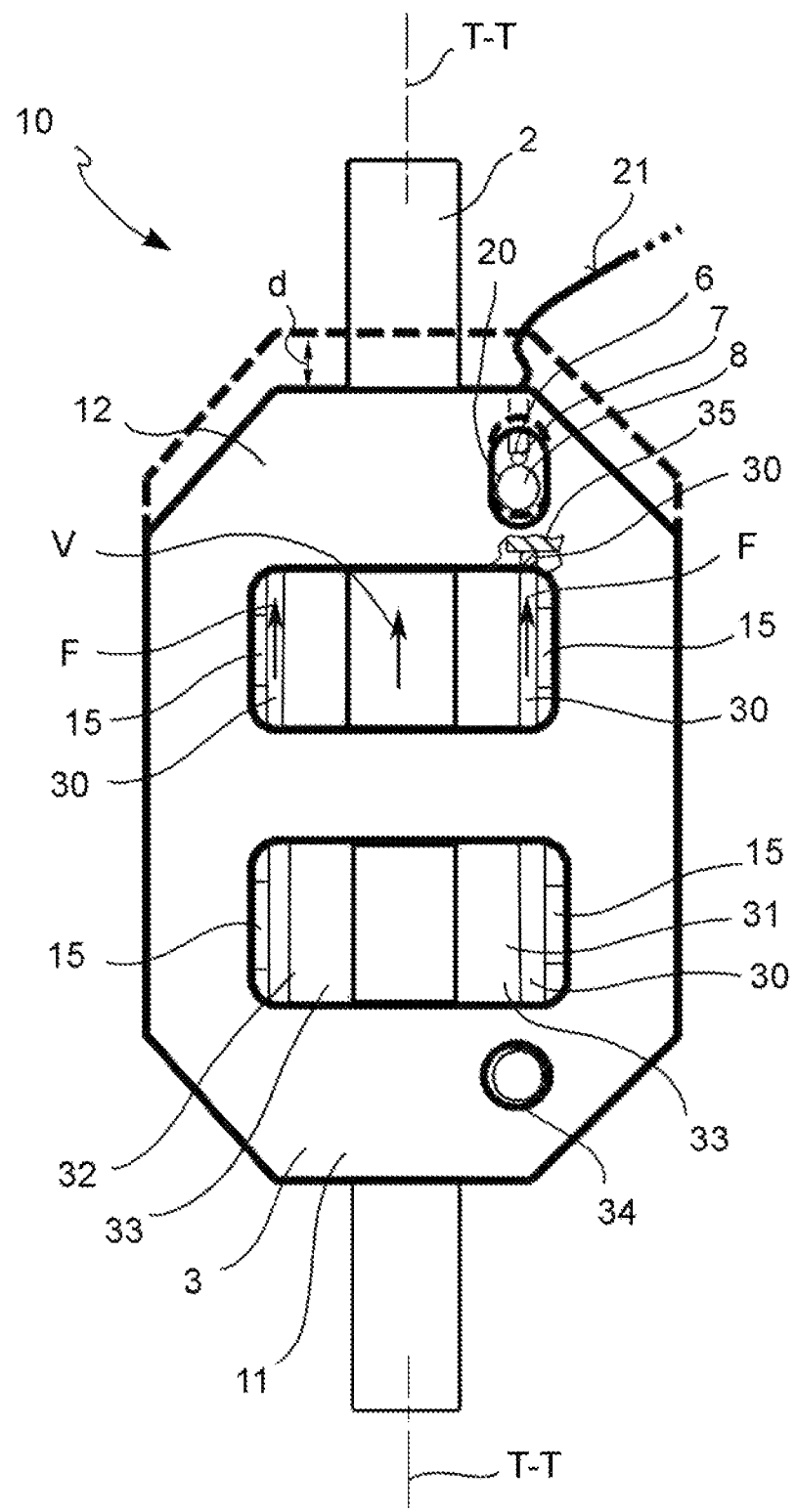
FIG. 3 is a diagrammatic plan view of a disc brake comprising a caliper and supporting assembly, according to an embodiment.
Figure 4:
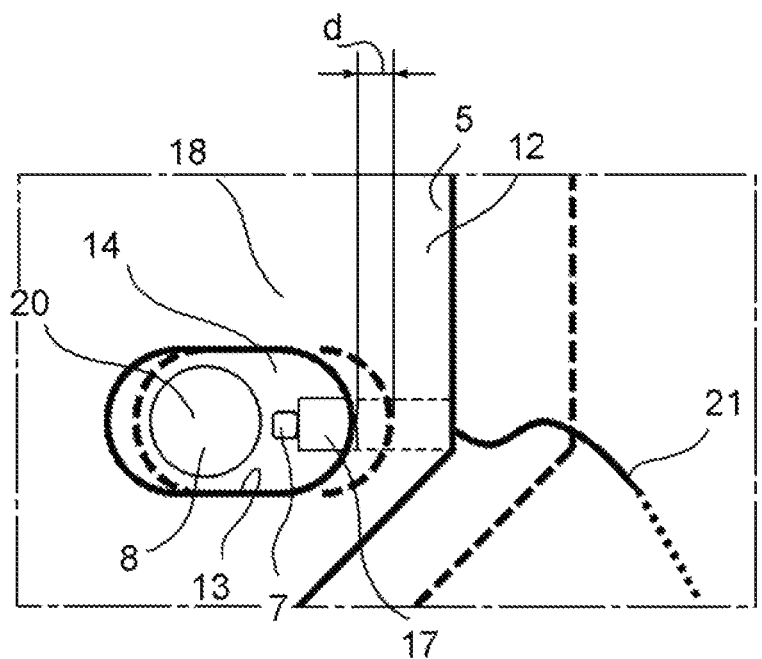
FIG. 4 shows a detail in FIG. 3.

According to a general embodiment, a caliper and supporting assembly 1 for a disc brake 10 comprises a brake caliper 3 and a supporting element 4.

In said disc brake 10 an axial direction X-X is defined either coinciding with or parallel to the rotation axis of the disc 2 of the disc brake 10, a radial direction R-R orthogonal to the axial direction X-X, and a tangential T-T or circumferential direction T-T, orthogonal to both the axial direction X-X and to the radial direction R-R.

Said brake caliper 3 comprises a caliper body 5, adapted to straddle an associable disc 2 of the disc brake 10.

Said support element 4 is connected to the said caliper body 5.

According to an embodiment, said supporting element 4 is adapted to connect to at least one arm of a vehicle suspension. According to an embodiment, said supporting element 4 is a hub carrier adapted to house a bearing for supporting a hub connectable to said disc 2 and to a wheel of the vehicle. According to an embodiment, said hub carrier delimits a hub housing 9 and is adapted to accommodate a bearing for supporting a hub connectable to said disc 2 and to a vehicle wheel.

Said caliper body 5 comprises a first portion 7. According to an embodiment, said caliper body 5 is integral with said first portion 7. According to an embodiment, said caliper body 5 and said first portion 7 are made of separate parts made integral to each other.

Said supporting element 4 comprises a second portion 8. According to an embodiment, said supporting element 4 is integral with said second portion 8. According to an embodiment, said caliper body 4 and said second portion 8 are made of separate parts made integral to each other.

According to a preferred embodiment, said first portion faces said second portion 8. According to a preferred embodiment, said first portion 7 faces said second portion 8 in said predetermined direction T-T.

During the braking action the caliper body 5 elastically deforms according to at least one predetermined direction T-T, thereby determining the displacement in at least said predetermined direction T-T of the first portion 7 of the caliper body 5 with respect to said second portion 8 of the supporting element 4.

Advantageously, said caliper and supporting assembly 1 comprises at least one detecting device 6 which detects a distance d at least along said predetermined direction T-T between said first portion 7 of the caliper body 5 and said second portion 8 of the supporting element 4.

In this manner, said detecting device 6 detects the deformation of the caliper body 5 along said predetermined direction T-T, during the braking action.

According to a predetermined embodiment, said at least one predetermined direction T-T is the tangential direction T-T.

In this manner, the deformation of the caliper body 5 along said predetermined direction T-T caused by the braking action can be detected.

Figure 5:
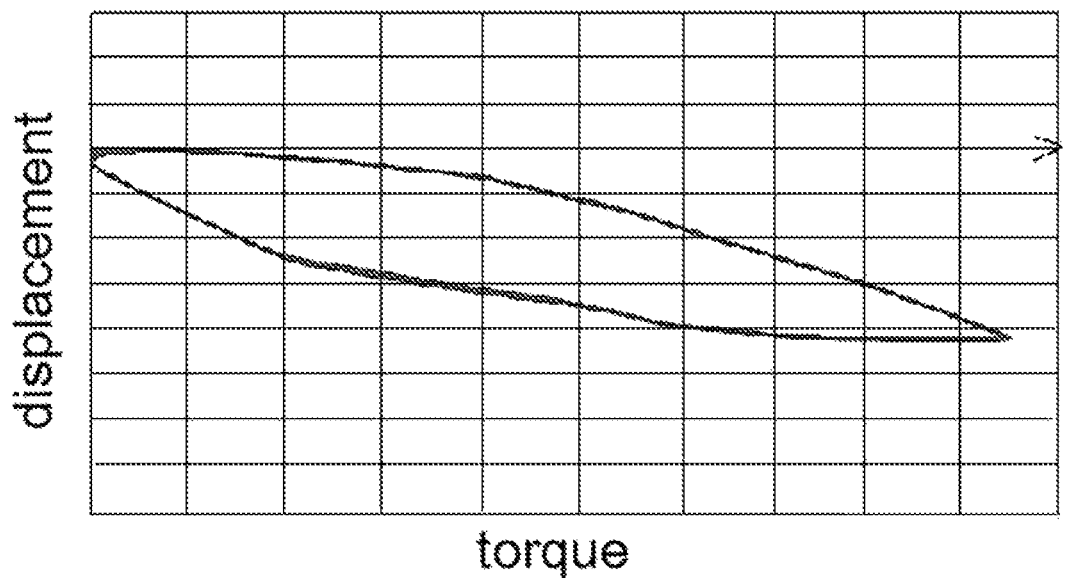
FIG. 5 is a chart which shows the braking torque on the ordinate axis and the detected distance on the abscissa axis.
Figure 6:
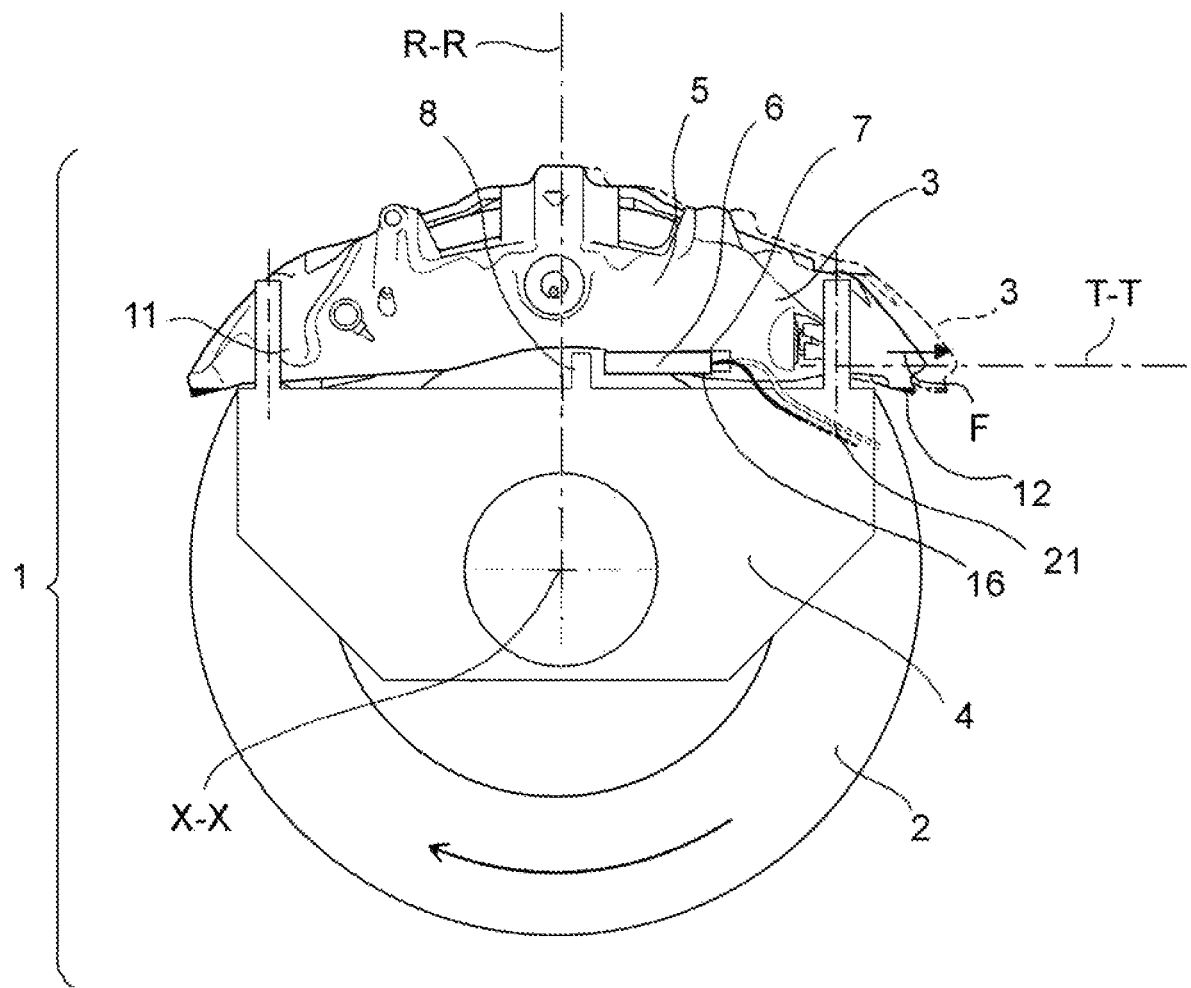
FIG. 6 shows a side view of a disc brake according to a further embodiment in which the detecting device is placed integral externally to an elongated element of the caliper body and faces a second portion of the supporting element provided in the supporting element overhangingly positioned on it a protruding towards the caliper body facing the detecting device.
Figure 7:
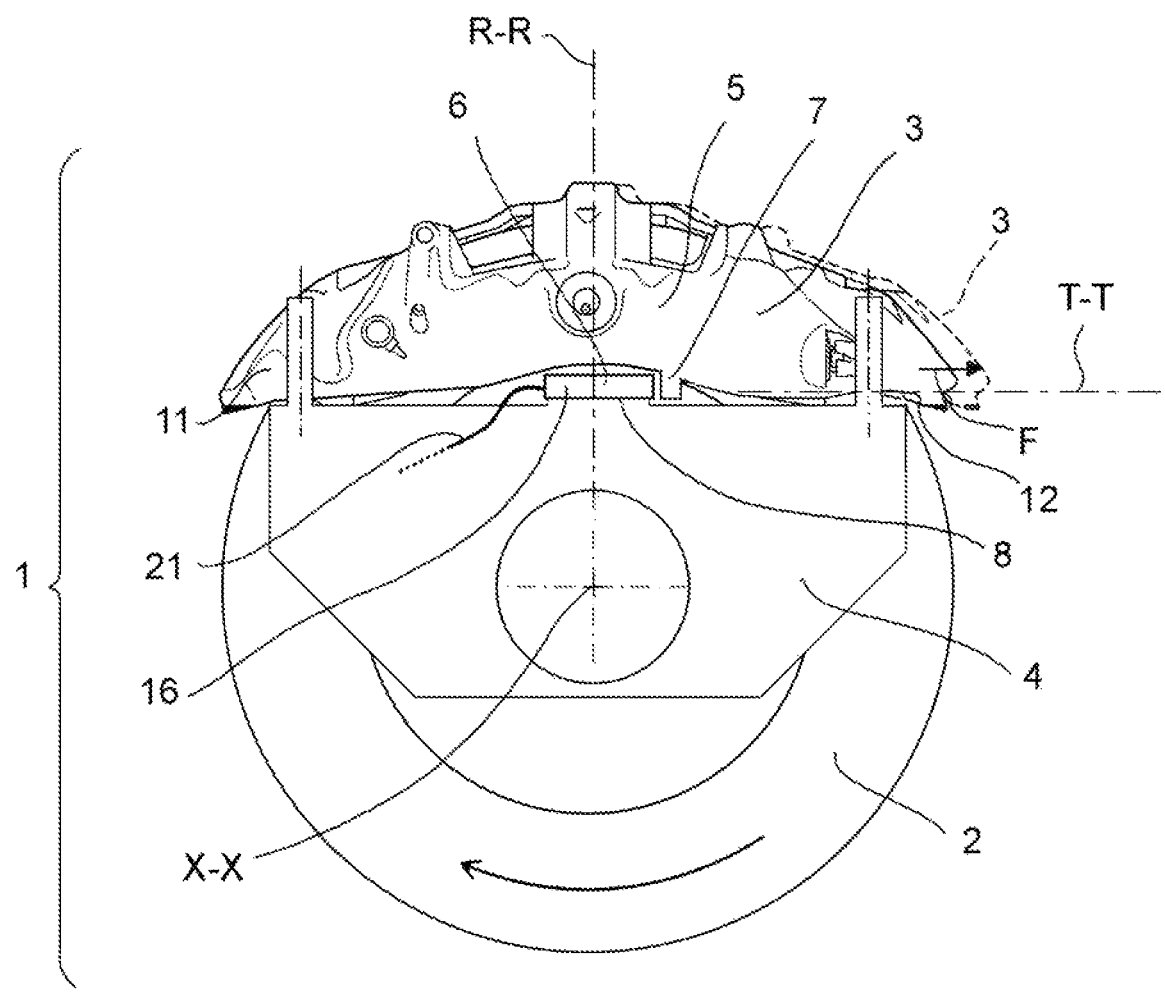
FIG. 7 shows a side view of a disc brake according to yet another embodiment in which the detecting device is place integral externally to the supporting element and faces a first portion which extends from an elongated element of the caliper body overhangingly placed on this elongated element and projecting towards the supporting element facing the detecting device.

As shown, for example, in FIG. 5, an analysis conducted by the inventors shows that the deformation of the caliper body 5 detected by detecting device 6 as a function of the braking torque for N loading cycles describes a hysteresis curve, wherein the curves relating to each loading cycle are perfectly superimposed. This makes it possible to affirm that the measurement of the distance d and the deformation of the caliper body during the braking action is repeatable and consequently reliable. In addition, this makes it possible to perform very accurate calibrations of the detecting device 6.

By providing said detecting device 6, it is possible to detect said distance d, which is proportional to the braking action. In this manner, the braking torque can be calculated on the basis of information acquired by said detecting device 6.

By providing such detecting device 6, the distance d evaluated in the tangential direction T-T is proportional to the force with which the disc pushes the pads in the tangential direction T-T. In this manner, it is possible to quantify the braking action by evaluating the deformation in tangential direction T-T of at least one portion of the caliper body.

According to an embodiment, said caliper body 5 comprises a first elongated portion 24, adapted to face, either directly or indirectly, by means of at least a first brake pad 31 a first braking surface of the disc 2, and an opposite second elongated portion 25 adapted to face, either directly or indirectly, by means of at least a second brake pad 32 a second braking surface of the disc 2, opposite to said first braking surface. According to an embodiment, said first elongated portion 24 is placed on one side of the caliper body 5 associated with said supporting structure 4. According to an embodiment, said first elongated portion 24 is placed on one side of the caliper body 5 associable with the vehicle by means of said supporting structure 4.

According to an embodiment, said caliper body 5 comprises at least one caliper bridge 26 which connects said first elongated portion 24 and said second elongated portion 25 straddling the disc 2.

According to an embodiment, said caliper body 5 comprises an inner caliper portion 27, adapted to face the disc 2 and an opposite outer caliper portion 28. Preferably, said inner caliper portion 27 delimits a disc housing 9 adapted to receive a portion of the disc 2.

According to an embodiment, at least either said first elongated portion 24 or said second elongated portion 25 delimits at least one thrust means housing 29 adapted to receive thrust means 15 adapted to press against the back of a brake pad 31, 32, preferably the back of a support plate 30 to the friction material 33 of an associable brake pad 31, 32.

According to an embodiment, said brake caliper 3 comprises thrust means 15, e.g. cylinder-piston assemblies, adapted to press a brake pad 31, 32 and close it against the facing the braking surface of the disc 2. According to an embodiment, said brake caliper 3 comprises thrust means 15 exclusively associated with said second elongated portion 25, thereby avoiding to provide thrust means 15 associated with said first elongated portion 24. According to an embodiment, said brake caliper 3 comprises thrust means 15 associated with said first elongated portion 24 and with said second elongated portion 25.

According to an embodiment, said brake caliper 3 comprises at least two opposite brake pads 31, 32, each comprising a friction material 33, adapted to press against opposite braking surfaces of the disc 2 during the braking action. According to an embodiment, each brake pad 31, 32 also comprises a supporting plate 30, adapted to support said friction material 33. According to an embodiment, each brake pad 31, 32 is made in one piece, e.g. of carbon.

According to an embodiment, said caliper body comprises a disc inlet side 11 and a disc outlet side 12 opposite to said disc inlet side 11 in tangential direction T-T. When in forward travel conditions of the vehicle, the disc 2 rotates in a rotation direction V, a given portion of the disc entering into said disc housing 9 of the caliper body 5 from said disc inlet side 11 and exiting from the disc housing 9 from said disc outlet side 12.

According to an embodiment, said caliper and supporting assembly 1 comprises at least one disc inlet side fixing device 34 which constrains said caliper body 5 with respect to said supporting element 4 along said predetermined direction T-T. Preferably said disc inlet side 11 of the caliper body 5 is associated with said disc inlet side fixing devices 34. Providing said disc inlet side fixing device 34 locally prevents the deformation of the caliper body 5, preferably on the disc inlet side of the caliper body, with respect to the supporting element 4 along said predetermined direction T-T.

According to an embodiment, said caliper body 5 comprises a connecting portion 18 which couples with said supporting element 4, and wherein said connecting portion comprises said first portion 7 of the caliper body 5.

According to an embodiment, said connecting portion 18 of the caliper body 5 couples with said supporting element 4, thereby avoiding the formation of a constraint along said at least one predetermined direction T-T, between said caliper body 5 and said supporting element 4. In this manner, the deformation of the caliper body 5 in said predetermined direction T-T is facilitated, without generating portions of elastic instability due to peak load in the caliper body 5.

According to an embodiment, said supporting element 4 comprises a connecting counter-portion which couples with said caliper body 5, and wherein said connecting counter-portion comprises said second portion 8 of the supporting element 4.

According to an embodiment, said connecting portion 18 of the caliper body 5 couples with said connecting counter-portion of the supporting element 4, thereby avoiding the formation of a constraint along said at least one predetermined direction T-T, between said caliper body 5 and said supporting element 4.

According to an embodiment, said connecting portion 18 of the caliper body 5 cooperates with said connecting counter-portion of the supporting element 4, thereby forming a constraint in axial direction X-X between said caliper body 5 and said supporting element 4.

According to an embodiment, said connecting portion of the caliper body 5 comprises at least one slot wall 13 which at least partly defines a slot 14.

According to an embodiment, said slot 14 receives a connecting device 20 of the supporting element 4 and describes a slot edge profile of shape elongated along said predetermined direction T-T, thereby avoiding the formation of a constraint between said caliper body 5 and said supporting element 4 in said predetermined direction T-T. In other words, said connection device 20 avoids abutting by moving along said predetermined direction T-T with respect to the caliper body 5 against said at least one wall of the slot 13.

Preferably, said slot 14 is arranged on said disc outlet side 12 of the caliper body 5.

Providing such slot 14 allows said caliper body 5 to form a constraint substantially sliding along said predetermined direction T-T between a portion of the caliper body 5 and said supporting element 4.

According to an embodiment, said slot edge describes a substantially oval profile. According to an embodiment, said slot edge describes a substantially elliptical profile.

According to an embodiment, said connecting counter-portion of the supporting element 4 comprises a connecting device 20 which is received in said slot 14 of the caliper body 5.

According to an embodiment, said at least one slot wall 13 comprises said first portion 7 of the caliper body 5.

According to an embodiment, said connecting device 20 comprises said second portion 8 of the supporting element 4.

According to an embodiment, said connecting device 20 of the supporting element 4 and of said slot 14 of the caliper body 5 couple with thereby avoiding the formation of a constraint along said at least one predetermined direction T-T, between said caliper body 5 and said supporting element 4.

According to an embodiment, said connecting device 20 cooperates with said at least one slot wall 13 of said caliper body 5 forming a constraint in axial direction X-X between said caliper body 5 and said supporting element 4.

According to an embodiment, said connecting device 20 comprises at least one stud bolt.

According to an embodiment, said connecting device 20 comprises at least one bush fitted on said stud bolt. In this manner, said bush slides against said at least one slot wall 13 during the braking action, thereby protecting said stud bolt from wear by friction, e.g. by sliding friction. Providing said bush also acts as a spacer to separate the tightening nut of the connecting device 20 from the caliper body, thereby avoiding preventing the friction exerted by the portion under the head of the tightening nut from obstructing or preventing deformation of the caliper body.

According to an embodiment, said disc outlet side 12 of the caliper body 5 comprising said first portion 7.

According to a preferred embodiment, said disc inlet side fixing device 34 is substantially aligned to said connecting device 20 along said preferred direction T-T.

During the braking action, the disc 2 applies on the brake pads 31, 32 a feeding action F, preferably directed substantially parallel to the rotation direction V of the disc 2, making the support plate 30 of at least one of said brake pads 31, 32 abut against a tangential abutment portion 35 of the caliper body 5. Preferably, said feeding action is directed along said predetermined direction T-T. In this manner, the feeding action which elastically deforms along said predetermined direction T-T at least one portion of the caliper body 5 interposed between said disc inlet side fixing device 34 and said abutment portion 35.

According to an embodiment, said detecting device 6 comprises at least one sensor 16. Preferably, said sensor 16 is an eddy current sensor.

According to an embodiment, said sensor 16 is an LVDT.

According to an embodiment, said sensor 16 is integral with the caliper body 5.

According to an embodiment, said sensor 16 is integral with said first portion 7 of the caliper body 5.

According to an embodiment, said sensor 16 comprises said first portion 7 of the caliper body 5.

According to an embodiment, said sensor 16 comprises an overhanging sensor portion 17 which overhangingly protrudes from said slot wall 13 into said slot 14 towards said connecting device 20.

According to an embodiment, said overhanging portion of the sensor 17 extends substantially along said predetermined direction T-T.

According to an embodiment, said sensor 16 comprises an output portion 19 of the sensor 16 adapted to connect with at least a data transmission wire 21. According to an embodiment, said detecting device 6 is associated with a data processing unit adapted to receive information on said tangential distance d to quantify the braking action and/or estimate the braking torque and/or calculate the braking force. Preferably, said detecting device 6 is associated with a data processing unit by means of said data transmission wire 21.

According to an embodiment, said brake caliper 3 comprises at least one brake fluid feeding pipe 22. Preferably, said detecting device 6 is situated near said brake fluid feeding pipe 22. In this manner, said data transmission wire 21 can favorably pass through the vehicle next to said brake fluid feeding pipe 22, thereby avoiding to provide an additional path dedicated to the data transmission wire 21.

According to an embodiment, said caliper body 5 comprises a flattened surface 23 which extends on a plane perpendicular to said predetermined direction T-T. Preferably, said flattened surface 23 extends over a portion of the caliper body 5 opposite to the disc 2 or unsuitable to face the disc 2. According to an embodiment, said outer caliper side 28 comprises said flattened surface 23.

According to an embodiment, said flattened surface 23 of the caliper body 5 is made by removing material.

According to an embodiment, said connecting portion 18 of the caliper body 5 comprises said flattened surface 23.

According to an embodiment, said detecting device 6, preferably said sensor 16, is associated with said flattened surface 23. According to an embodiment, said outlet portion 19 of the sensor 16 overhangingly protrudes from the flattened surface 23.

According to an embodiment, said brake caliper 3 is a fixed type caliper.

According to an embodiment, said brake caliper 3 is a floating type caliper.

A method for detecting the deformation of the caliper body during the braking action will be described below.

A method for detecting the deformation of the caliper body during the braking action along a predetermined direction T-T comprises the following steps:
  providing a caliper and supporting assembly 1, said assembly of the caliper and the support 1 comprising a brake caliper 3 comprising a caliper body 5 and a supporting element 4 connected to said caliper body 5;

identifying a first portion of the caliper body 7 which during the braking action moves with respect to a second portion of the supporting element 8;

detecting a distance d along at least said predetermined direction T-T between said first portion 7 of the caliper body 5 and said second portion 8 of the supporting element 4.

According to a possible operating mode, the step of detecting a distance d along at least said predetermined direction T-T between said first portion 7 of the caliper body 5 and said second portion 8 of the supporting element 4 is performed by detecting said distance d at least along the tangential direction T-T.

According to a possible mode of operation, the step of detecting a distance d along at least said predetermined direction T-T between said first portion 7 of the caliper body 5 and said second portion 8 of the supporting element 4 is performed both during the braking action and in forward travel conditions.

According to a possible mode of operation, said method comprises the following additional step of comparing the distance detected in braking conditions with the distance detected in forward travel conditions.

According to a general embodiment, a caliper body 5 for a brake caliper 3 of a disc brake 10 is provided, wherein an axial direction X-X is defined, either coinciding with or parallel to the rotation axis of a disc 2 of the disc brake, a radial direction R-R orthogonal to the axial direction X-X, and a tangential T-T or direction T-T direction, orthogonal both to the axial direction X-X and to the radial direction R-R. Said caliper body 5 comprises a disc inlet side 11 and a disc outlet side 12 opposite to said disc inlet side 11 in the tangential direction T-T, wherein at least either said disc inlet side 11 or said disc outlet side 12, preferably said disc outlet side 12, comprises at least one slot wall 13 which at least partly defines a slot 14 adapted to receive a connecting device 20 for forming a connection between the caliper body 5 and an associable supporting element 4. Said slot 14 has an extension in tangential direction T-T greater than the dimension in tangential direction T-T of the connecting device 20, so as to define between at least one of said slot walls and said connecting device 20 a predetermined tangential distance d, when said connection device 20 is accommodated in said slot 14, thereby allowing, during the braking action, at least one portion of the caliper body 5 to deform elastically in tangential direction T-T.

According to an embodiment, at least one of said walls of slot 13 comprises at least one first portion 7 movable during the braking action in a tangential direction T-T with respect to a second portion 8 of the supporting element 4 associable with the caliper body 5.

According to an embodiment, said caliper body 5 is associated with a detecting device 6 which is adapted to detect the tangential distance d between said slot wall 13 and said connecting device 20.

By virtue of the features described above, either mutually separately or jointly in particular embodiments, it is possible to obtain an assembly and a method which at the same time satisfies the aforesaid mutually contrasting needs and the aforesaid desired advantages, and in particular:

makes it possible to detect the deformation of the caliper body in a simple and repeatable manner;

makes it possible to obtain a method for quantifying the braking action, based on detecting the deformation of the caliper body, which is simple to manufacture and at the same time improved reliability and repeatability with respect to known solutions, although being adapted for every type of brake caliper;

makes it possible to detect a quantity proportional to the braking torque;

makes it possible to place the detecting device on a flattened surface 23 of the caliper body, formed substantially perpendicular to the direction along which the deformation of the caliper body is evaluated;

makes it possible to arrange the detecting device and the associable data transmission wire 21 in a portion of the caliper body which already provides the connection with the brake fluid feeding circuit, so as to facilitate the passage of said data transmission wire 21 in the vehicle body.

A person skilled in art may make many changes, adaptations and replacements to the embodiments described above or may replace elements with others which are functionally equivalent in order to satisfy contingent needs without however departing from the scope of protection of the appended claims.

According to a general embodiment, a caliper and supporting assembly 1 for a disc brake comprises a brake caliper 3. Said brake caliper 3 comprising a caliper body 5, adapted to straddle an associable disc 2 of the disc brake.

Said caliper and supporting assembly 1 further comprises a supporting element 4 connected to said caliper body 5.

Said caliper body 5 comprises a first portion 7, e.g. a portion of the elongated element 24.

Said supporting element 4 comprises a second portion 8, e.g. a bracket which overhangingly protrudes towards said first elongated portion of the caliper body 24.

During the braking action the caliper body 5 elastically deforms according to at least one predetermined direction T-T, thereby determining the displacement in at least said predetermined direction T-T of the first portion 7 of the caliper body 5 with respect to said second portion 8 of the supporting element 4.

Said caliper and supporting assembly 1 comprises at least one detecting device 6 fixed to said first portion 7 of the elongated element 24, which detects a distance "d" at least along said predetermined direction T-T between said first portion 7 of the caliper body 5 and said second portion 8 of the supporting element 4.

According to an embodiment, a disc brake 10 is provided, in which the detecting device 6 is placed integral externally to an elongated element 24 of the caliper body 5 and faces a second portion 8 of the supporting element 4 provided in the supporting element 4 and is arranged overhanging it protruding towards the caliper body 5 facing the detecting device 6.

According to a general embodiment, a caliper and supporting assembly 1 for a disc brake comprises a brake caliper 3. Said brake caliper 3 comprising a caliper body 5, adapted to straddle an associable disc 2 of the disc brake.

Said caliper and supporting assembly 1 further comprises a supporting element 4 connected to said caliper body 5.

Said caliper body 5 comprises a first portion 7, e.g. an elongated element portion 24, e.g. a bracket which overhangingly protrudes towards said supporting element 4.

Said supporting element 4 comprises a second portion 8.

During the braking action the caliper body 5 elastically deforms according to at least one predetermined direction T-T, thereby determining the displacement in at least said predetermined direction T-T of the first portion 7 of the caliper body 5 with respect to said second portion 8 of the supporting element 4.

Said caliper and supporting assembly 1 comprises at least one detecting device 6 fixed to said second portion 8 of the supporting element 4, which detects a distance "d" at least along said predetermined direction T-T between said first portion 7 of the caliper body 5 and said second portion 8 of the supporting element 4.

According to a further embodiment, a disc brake 10 is provided in which the detecting device 6 is rigidly connected to the outside of the supporting element 4 and faces a first portion 7 which extends from an elongated element 24 of the caliper body 5 overhangingly placed on this elongated element 24 and projecting towards the supporting element 4 facing the detecting device 6.

LIST OF REFERENCES

1 Caliper and supporting assembly
2 Disc
3 Brake caliper
4 Supporting element
5 Caliper body
6 Detecting device
7 First portion of the caliper body
8 Second portion of the supporting element
9 Hub carrier
10 Disc brake
11 Caliper body disc inlet side
12 Caliper body disc outlet side
13 Slot wall
14 Slot
15 Thrust means
16 Sensor
17 Overhanging portion of the sensor
18 Connecting portion of the caliper body to the supporting element
19 Sensor outlet portion
20 Supporting element connecting device
21 Data transmission wire
22 Brake fluid feeding pipe
23 Flattened surface
24 Caliper body first elongated portion
25 Caliper body second elongated portion
26 Caliper bridge
27 Caliper inner side
28 Caliper outer side
29 Thrust means housing
30 Brake pad supporting plate
31 First brake pad
32 Second brake pad
33 Friction material
34 Fixing device
35 Tangential abutment portion
X-X. Axial direction
T-T. Tangential direction
R-R. Radial direction
V. Direction of rotation of disc
F. Feeding action

The invention claimed is:

1. A caliper and supporting assembly for a disc brake, wherein an axial direction, either coinciding with or parallel to a rotation axis of a disc of the disc brake, a radial direction orthogonal to the axial direction, and a tangential or circumferential direction, orthogonal both to the axial direction and to the radial direction are defined;

said caliper and supporting assembly comprising a brake caliper comprising a caliper body adapted to straddle an associable disc of the disc brake and a supporting element connected to said caliper body;

wherein said caliper body comprises a first portion;

said supporting element comprises a second portion;

said caliper body is elastically deformed according to at least one predetermined direction during braking action, thereby determining a displacement in at least said predetermined direction of the first portion of the caliper body with respect to said second portion of the supporting element;

said caliper and supporting assembly further comprising at least one detecting device which detects a distance between said first portion of the caliper body and said second portion of the supporting element, measured along at least said predetermined direction and associated with the displacement, said supporting element comprises a connecting counter-portion which is connected to said caliper body, and wherein said connecting counter-portion comprises said second portion of the supporting element, and said connecting portion of the caliper body is connected to said connection counter-portion of the supporting element, avoiding forming a constraint locking said caliper body along said at least one predetermined direction between said caliper body and said supporting element.

2. The caliper and supporting assembly of claim 1, wherein said brake caliper is a fixed caliper, and the detecting device is placed integral externally to an elongated element of the caliper body and faces the second portion of the supporting element provided in the supporting element and is arranged overhanging said supporting element and protruding towards the caliper body facing the detecting device.

3. The caliper and supporting assembly of claim 2, wherein the detecting device is placed integral externally to the supporting element and faces the first portion which extends from the elongated element of the caliper body overhangingly placed on the elongated element and projecting towards the supporting element facing the detecting device.

4. The caliper and supporting assembly of claim 1, wherein said at least one predetermined direction is the tangential direction.

5. The caliper and supporting assembly of claim 1, wherein said first portion faces said second portion along said predetermined direction, said caliper body comprises a connecting portion which is connected to said supporting element, and wherein said connecting portion comprises said first portion of the caliper body, and said connecting portion of the caliper body is connected to said supporting element, avoiding forming a constraint locking said caliper body along said at least one predetermined direction between said caliper body and said supporting element.

6. The caliper and supporting assembly of claim 1, wherein a connecting portion of the caliper body comprises at least one slot wall which at least partly defines a slot, and said connecting counter-portion of the supporting element comprises a connecting device which is received in said slot of the caliper body, and said at least one slot wall comprises said first portion of the caliper body, and said connecting device comprises said second portion of the supporting element, and said connecting device of the supporting element and of said slot of the caliper body are coupled to one another, avoiding forming a constraint locking said caliper body along said at least one predetermined direction between said caliper body and said supporting element, and said connecting device comprises at least one stud bolt, and said connecting device comprises at least one bush fitted onto said stud bolt, and said connecting device cooperates with said at least one slot wall of said caliper body forming a constraint in axial direction between said caliper body and said supporting element.

7. The caliper and supporting assembly of claim 1, wherein said detecting device comprises at least one sensor, wherein said sensor is an eddy current and/or LVDT sensor, and said sensor is integral with the caliper body, and said sensor is integral with said first portion of the caliper body, and said sensor comprises said first portion of the caliper body, and said sensor comprises a protruding portion of the sensor which overhangingly protrudes from said slot wall into said slot towards said connecting device, and said overhanging portion of the sensor extends substantially along said predetermined direction.

8. The caliper and supporting assembly of claim 1, wherein said caliper body comprises a flattened surface which extends on a plane perpendicular to said predetermined direction, wherein said flattened surface extends over a portion of the caliper body opposite to the disc or unsuitable to face the disc, and said flattened surface of the caliper body is obtained by removing material, and said connecting portion of the caliper body comprises said flattened surface, and said detecting device is associated with said flattened surface, and an outlet portion of the sensor overhangingly protrudes from the flattened surface.

9. The caliper and supporting assembly of claim 1, wherein said supporting element is a hub carrier adapted to house a bearing for supporting a hub connectable to said disc and to a wheel of a vehicle, and said detecting device is associated with a data processing unit adapted to receive information on tangential distance to quantify braking action and/or estimate braking torque and/or calculate braking force.

10. A method for detecting a deformation of the caliper body during braking action along a predetermined direction comprising the following steps:

providing a caliper and supporting assembly, said assembly comprising a brake caliper comprising a caliper body and a supporting element connected to said caliper body;

identifying a first portion of the caliper body which moves with respect to a second portion of the supporting element during the braking action; and detecting a distance along at least said predetermined direction between said first portion of the caliper body and said second portion of the supporting element, providing a supporting element as part of said supporting assembly, wherein said supporting element comprises a connecting counter-portion which is connected to said caliper body, connecting a connecting portion of the caliper body to said connection counter-portion of the supporting element, avoiding forming a constraint locking said caliper body along said at least one predetermined direction between said caliper body and said supporting element, detecting said distance both during the braking action and in a forward direction along a tangential direction orthogonal to an axial direction parallel a rotational axis of a disc associated with the caliper; and comparing the detected distance in braking conditions with the detected distance in the forward direction.

11. A caliper and supporting assembly for a disc brake, wherein an axial direction, either coinciding with or parallel to a rotation axis of a disc of the disc brake, a radial direction orthogonal to the axial direction, and a tangential or circumferential direction, orthogonal both to the axial direction and to the radial direction are defined;

said caliper and supporting assembly comprising a brake caliper comprising a caliper body adapted to straddle an associable disc of the disc brake and a supporting element connected to said caliper body;

wherein said caliper body comprises a first portion;

said supporting element comprises a second portion;

said caliper body is elastically deformed according to at least one predetermined direction during braking action, thereby determining a displacement in at least said predetermined direction of the first portion of the caliper body with respect to said second portion of the supporting element;

said caliper and supporting assembly further comprising at least one detecting device which detects a distance between said first portion of the caliper body and said second portion of the supporting element, measured along at least said predetermined direction and associated with the displacement;

and wherein said first portion faces said second portion along said predetermined direction, said caliper body comprises a connecting portion which is connected to said supporting element, and wherein said connecting portion comprises said first portion of the caliper body, and said connecting portion of the caliper body is connected to said supporting element, avoiding forming a constraint locking said caliper body along said at least one predetermined direction between said caliper body and said supporting element, and wherein said supporting element comprises a connecting counter-portion which is connected to said caliper body, and wherein said connecting counter-portion comprises said second portion of the supporting element, and said connecting portion of the caliper body is connected to said connection counter-portion of the supporting element, avoiding forming a constraint locking said caliper body along said at least one predetermined direction between said caliper body and said supporting element.

\* \* \* \* \*